G. A. BOYDEN, Jr., AND J. C. BOYDEN.
RAILWAY CAR TRUCK.
APPLICATION FILED JUNE 23, 1920.
1,414,497.
Patented May 2, 1922.
4 SHEETS—SHEET 4.
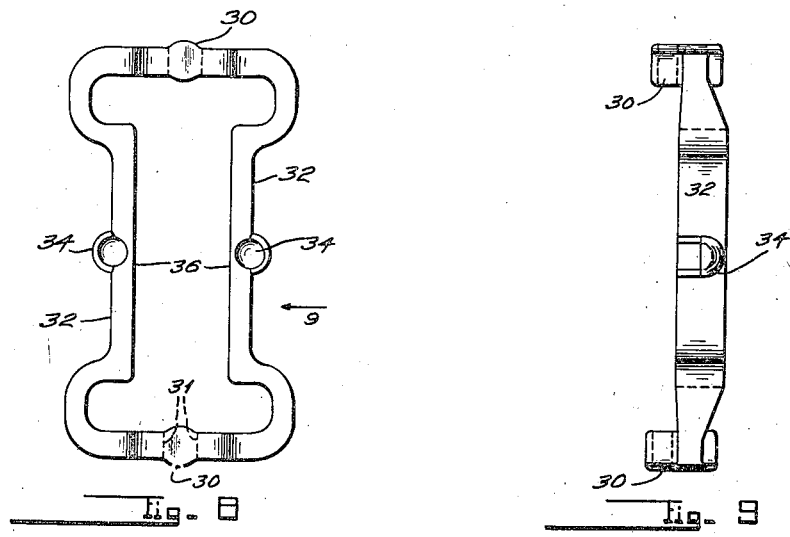
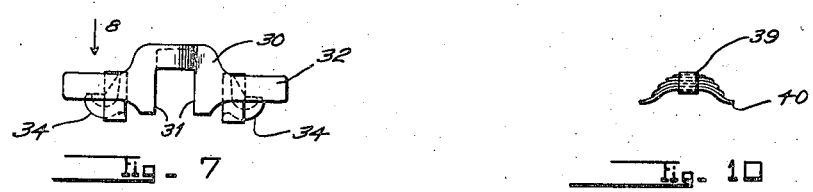

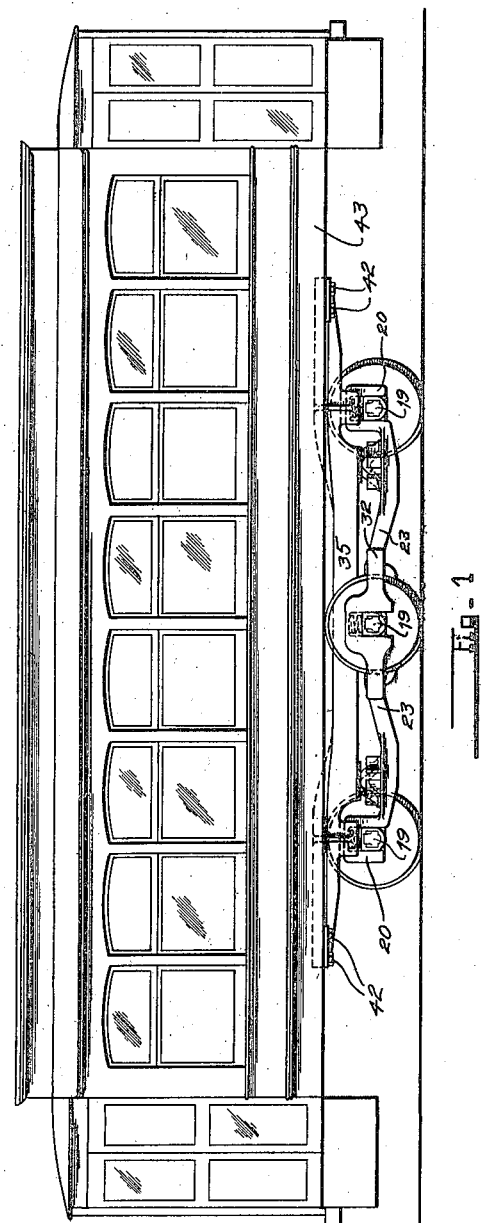

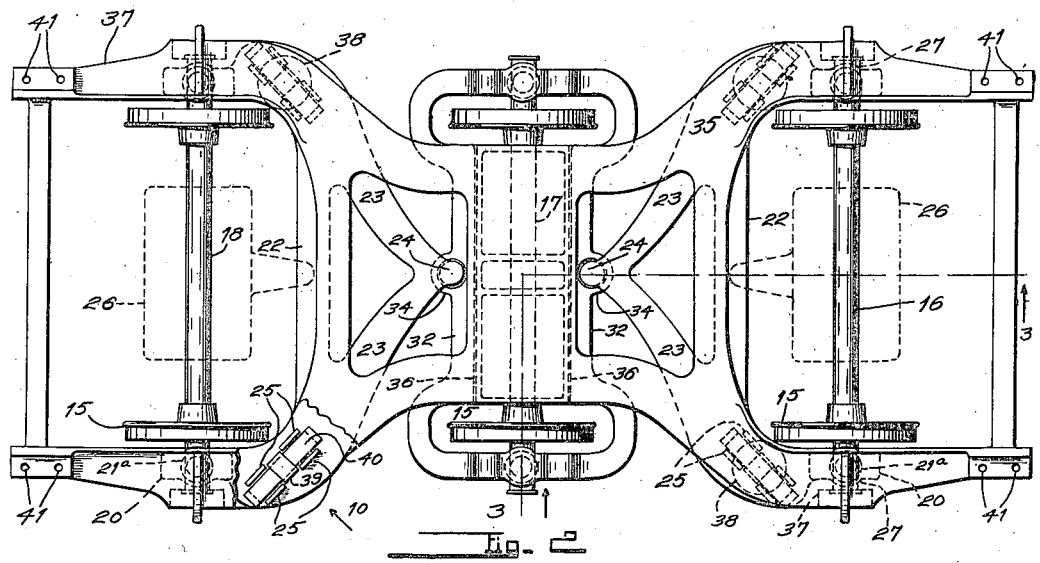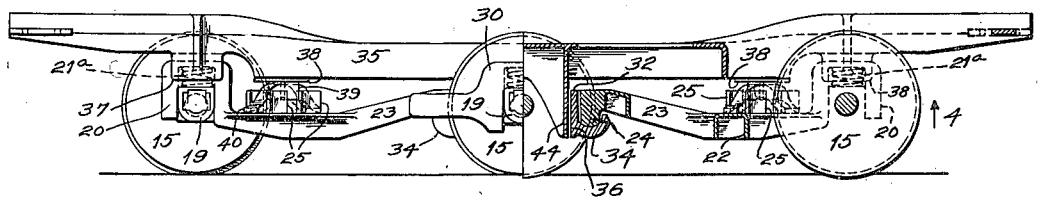

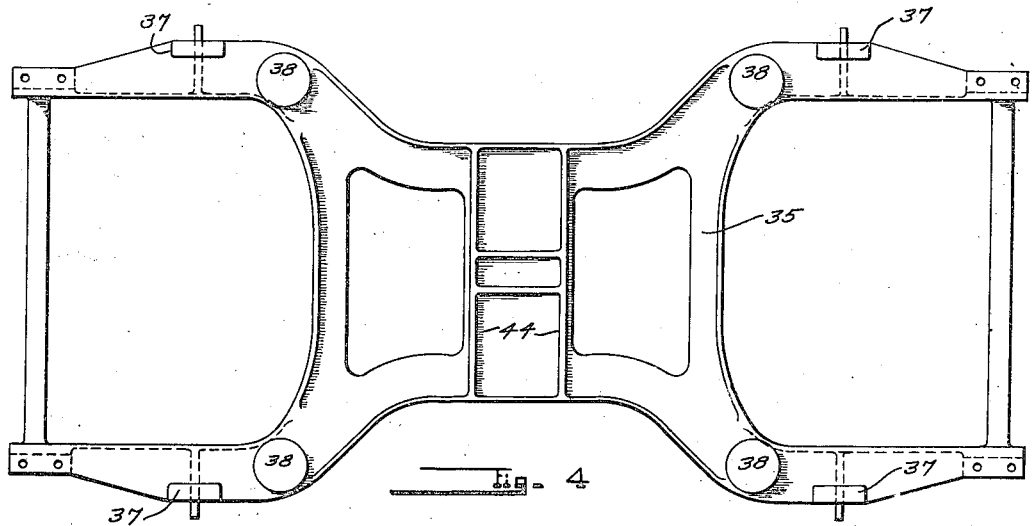
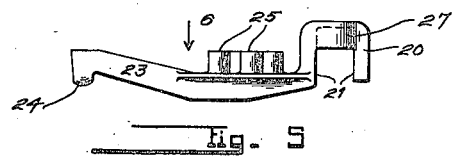
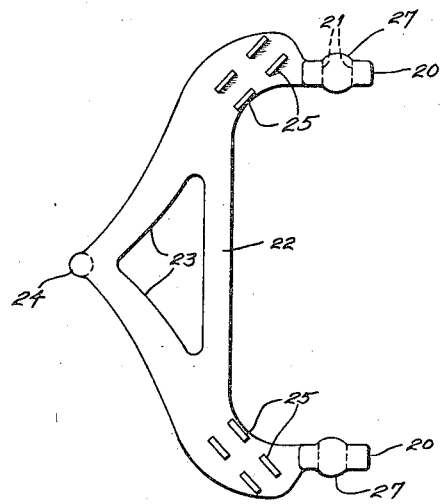

UNITED STATES PATENT OFFICE.

GEORGE A. BOYDEN, JR., AND JOHN C. BOYDEN, OF BALTIMORE, MARYLAND.

RAILWAY CAR TRUCK.

1,414,497. Specification of Letters Patent. Patented May 2, 1922.

Application filed June 23, 1920. Serial No. 391,169.

*To all whom it may concern:*

Be it known that we, GEORGE A. BOYDEN, Jr., and JOHN C. BOYDEN, citizens of the United States, residing at Baltimore, in the State of Maryland, have invented certain new and useful Improvements in Railway Car Trucks (Case G;) and we do hereby declare the following to be a full, clear, and exact description of the invention, such as will enable others skilled in the art to which it appertains to make and use the same.

Our invention relates to railway car trucks.

Our application for U. S. Letters Patent for railway car trucks, Case A, which was filed May 22, 1919 and serially numbered 298953 involves a truck comprising members that act coordinately horizontally so that the wheels and journals will conform to the contour of the rails, whatever it may be.

The truck shown in said application involves disparate vertical actions of the members and said actions are fully explained in our application for U. S. Letters Patent for railway car trucks, Case C, which was filed on February 21, 1920 and serially numbered 360481.

The truck shown in both of said applications was provided with a king pin or centre plate by means of which one of said trucks was to be pivotally secured to each end of a car body.

The truck shown in the present application is intended for use wherever it is desirable to use but one truck with each car body, and the wheels and journals have the same horizontal coordinating action as in the truck shown in said first and second named applications, but the truck shown in the present application has equalized vertical actions as in the truck shown in our application for U. S. Letters Patent for railway car trucks, Case F, which was filed April 6, 1920 and serially numbered 371664, although it may have disparate vertical actions as in the truck shown in said first and second named applications.

Among the objects of our present invention are:—

To provide a railway car truck so constructed and arranged that when but a single truck is applied to a car body the wheels of said truck will have a horizontal coordinating action through which the lateral positions of the wheels and the mutual angularity of the axles will be so disposed as to minimize the friction between the wheels and rails.

In the drawings:—

Figure 1 shows a car body equipped with our improved truck.

Fig. 2 is a plan view of our improved truck, one arm of the coordinating plate being broken away in order to show the subjacent spring.

Fig. 3 is a side view of our improved truck when viewed in the direction of the arrows in Fig. 2, said view being partly in section as taken along the line 3—3 in said figure.

Fig. 4 is a view of the coordinating plate viewed in the direction of the arrow 4 in Fig. 3.

Fig. 5 is a side view of one of the end frames of our improved truck.

Fig. 6 is a view of the member shown in Fig. 5 looking in the direction of the arrow 6 in said figure.

Fig. 7 is a side view of the central frame.

Fig. 8 is a view of the frame shown in Fig. 7 looking in the direction of the arrow 8 in said figure.

Fig. 9 is a view of the frame shown in Fig. 8 looking in the direction of the arrow 9 in said figure.

Fig. 10 is a view of one of the springs used with our improved truck when viewed in the direction of the arrow 10 in Fig. 2.

In the drawings:—

15 represents the wheels and 16, 17 and 18 represent, respectively, the pilot, central and trailer axles. The journals of the axles are mounted in any approved form of axle box such as 19 and the axles and wheels are of any approved construction.

Each pilot and trailer bolster consists of a pair of pedestals such as 20, each pedestal being provided with jaws 21ª for the reception of the journal box 19, which slides vertically therein. A spring such as 21 is introduced between each of the pedestals 20 and the top of the corresponding journal box 19. The pedestals 20—20 of each end member are joined together by the frame 22 and said frame is provided with arms 23—23 terminating in the boss 24 having an approximately hemispherical lower surface.

The frame 22 is provided with spring guides such as 25, four of said guides located near each pedestal 20. The frames 22 may be provided with any approved form of braking mechanism and any approved form of electric motor, as shown dotted at 26 in Fig. 2, may be supported upon the axles 16 and 18, and the noses of said motors may be suspended in any approved manner from the frames 22. The brakes, motors and related mechanisms not forming a part of our invention will not be further adverted to.

Each pedestal 20 is provided near its top with a cylindrical surface 27 for a purpose hereinafter explained. The central bolster consists of a pair of pedestals 30—30, each pedestal being provided with jaws 31 for the reception of the journal box 19 which slides vertically therein. The pedestals 30 are joined together by the frame 32 and said frame may be provided with any approved form of braking mechanism.

The frame 32 is provided on each side with a socket 34 having a hemispherical bottom. One of the bosses 24 is introduced in each of the sockets 34 and serves to connect the corresponding end member with the central member. The frame 32 is provided with finished surfaces 36 on the inner sides thereof, for a purpose hereinafter explained.

It is to be noted that by reason of the shape of the boss 24 and socket 34, each end member, in addition to revolving in a horizontal plane around the axis of said socket, can move angularly in vertical planes; thus the articulation of each end member with reference to the central member is substantially a universal joint.

The coordinating plate 35 is provided with four bearings 37 which extend over the cylindrical surfaces 27 of the pedestals 20. It is further provided with spring caps 38 and the latter rest upon the clamp 39 which secures the leaves of the spring 40 together. The clamps 39 are made of such a width that they slide freely within the spring guides 25 (see Figs. 2 and 3.)

The coordinating plate 35 is provided with holes such as 41 through which pass bolts 42 which secure said plate to the car body 43. The coordinating plate 35 is provided with gibs 44 which project downwardly and each has a sliding bearing upon one of the surfaces 36 of the frame 32, thus connecting the coordinating plate and the central bolster together in such a manner that while the former can have angular movements in a vertical plane and vertical and transverse movements with reference to the latter, yet the latter is forced to partake of the angular movement in a horizontal plane of the former.

Each of the bearings 37 of the coordinating plate 35 may have vertical and longitudinal movements as well as angular movements with reference to the corresponding cylindrical surface 27, but said surfaces acting against said bearings move the ends of the coordinating plate 35 horizontally in order to effect the coordinating movement of said plate.

The truck members are coordinated horizontally according to the methods set forth in Case A, with the exception that each pilot and trailer bolster is joined by a ball and socket joint to the central bolster on the near side thereof.

The coordinating plate is in fixed relation to the car body. Movements of the end and central bolsters with reference to the coordinating plate which are permitted by the resilience of the springs 40 and the ball and socket joint ensure the utmost freedom of the wheels in following the vertical contour of the rails.

As set forth in Case A, the coordinated horizontal movements of the members provide for the utmost freedom of the wheels in following the horizontal contour of the rails.

Thus, the truck illustrated and described in this application provides for the minimization of the friction due to the vertical and transverse stresses against the rails and thus insures a minimization of the longitudinal stress against the draw bar which effectuates a great reduction in operating costs.

We claim:—

1. In a six wheel truck, the combination with a bolster for each axle, a pivotal connection between the central bolster and each of the pilot and trailer bolsters, a coordinating plate having a transverse sliding connection with the central bolster and a longitudinal sliding connection with each of the pilot and trailer bolsters and a car body bolted to said coordinating plate.

2. In a six wheel truck, the combination with a bolster for each axle, a universal connection between the central bolster and each of the pilot and trailer bolsters, a coordinating plate having a transverse sliding connection with the central bolster, a longitudinal sliding connection with each of the pilot and trailer bolsters and a vertically resilient connection with each of the pilot and trailer bolsters, and a car body bolted to said coordinating plate.

3. In a six wheel truck, the combination with bolsters and journal boxes for each axle, springs between said journal boxes and bolsters, of a universal connection between the central bolster and each of the pilot and trailer bolsters, springs mounted upon said pilot and trailer bolsters, a coordinating plate having a transverse sliding connection with the central bolster, a longitudinal sliding connection with each of the pilot and trailer bolsters, and a sliding connection with each said last-named springs transverse to the direction of the load stress.

4. In a six wheel truck, the combination with bolsters and journal boxes for each axle, springs between said journal boxes and bolsters, of a pivotal connection between the central bolster and each of the pilot and trailer bolsters, springs mounted upon said pilot and trailer bolsters, and a coordinating plate engaging said last-named springs and said pilot, central and trailer bolsters.

5. A truck member comprising pedestals, a frame joining said pedestals together adjacent said pedestals, spring guides on said frame and arms on said frame provided with one member of a pivotal connection.

6. A coordinating member for use in a six wheel car truck comprising gibs extending transversely of said member located near the centre thereof, bearings extending longitudinally of said member located near the ends thereof and spring caps on said member intermediate said gibs and caps.

7. The combination with a car body of a coordinating member rigidly secured to said car body, of gibs located near the centre of said member and extending transversely thereof and bearings located near the ends of said member and extending longitudinally thereof.

8. In a six wheel truck, the combination with a rigid structure subjected to the vertical load stresses, of pilot, central and trailer bolsters articulated together and engaging said structure, axle boxes, springs between said boxes and said bolsters and springs between said pilot and trailer bolsters and said structure.

9. In a six wheel truck, the combination with a bolster for each pair of journals, of a coordinating plate engaging with the central bolster, bearings on said coordinating plate and cylindrical surfaces on the pilot and trailer bolsters engaging said bearings.

10. The herein described method of guiding a car body by curved rails which consists in securing to said body a single truck, said truck comprising six flanged wheels mounted in pairs upon three axles, one of said axles being mounted in each of two end and a central bolster, said end bolsters being articulated to said central bolster, moving said wheels transversely to conform to said rails by the pressure of said rails against the flanges of said wheels, and coordinating horizontally angularly said axles by a coordinating plate secured to said body.

11. The method of guiding by curved rails a car body supported by a coordinating element consisting in obtaining independent transverse movements of the journals and a coordinating angular movement of the several journals by the interaction of said journals and coordinating element whereby the friction is no greater on the curve than on the straight rail.

In testimony whereof, we affix our signatures.

GEORGE A. BOYDEN, Jr.
JOHN C. BOYDEN.